(12) United States Patent
Schaaf et al.

(10) Patent No.: US 6,559,271 B2
(45) Date of Patent: May 6, 2003

(54) METHOD FOR PRODUCING POLYESTERS WITH A REDUCED CONTENT OF FREE ACETALDEHYDE

(75) Inventors: Eckehart Schaaf, Teltow (DE); Gerald Rafler, Potsdam (DE); Rainer Hagen, Berlin (DE)

(73) Assignee: Inventa-Fischer GmbH & Co. KG, Berlin (DE)

( * ) Notice: Subject to any disclaimer, the term of this patent is extended or adjusted under 35 U.S.C. 154(b) by 0 days.

(21) Appl. No.: 09/951,177

(22) Filed: Sep. 13, 2001

(65) Prior Publication Data
US 2002/0128427 A1 Sep. 12, 2002

(51) Int. Cl.[7] .......................... B29D 22/00; C08F 20/00
(52) U.S. Cl. .................. 528/272; 528/275; 528/279; 528/286; 528/302; 528/308; 528/308.6; 525/437; 525/443; 524/81; 524/706; 524/710; 428/35.7
(58) Field of Search ........................ 528/275, 279, 528/286, 302, 308, 308.6; 525/437, 443; 524/81, 706, 710; 428/35.2, 35.7

(56) References Cited

U.S. PATENT DOCUMENTS

| 4,837,115 A | 6/1989 | Igarashi et al. |
| 5,258,233 A | 11/1993 | Mills et al. |
| 5,656,221 A | 8/1997 | Schumann et al. |
| 5,656,719 A | 8/1997 | Stibal et al. |
| 6,656,221 | 8/1997 | Schumann et al. |

FOREIGN PATENT DOCUMENTS

| DE | 195 03 053 A1 | 8/1996 |
| EP | 0 719 582 B1 | 11/1995 |
| WO | 96/37534 | 11/1996 |
| WO | 97/31968 | 9/1997 |
| WO | 98/18848 | 5/1998 |

OTHER PUBLICATIONS

A Horbach, et al.; Mark–Houwink–Beziehung fur Polytetramethylenterephthalat im Vergleich zu Polyethylen–und Polyhexamethylenterephthalat; Nov. 18, 1980; pp. 35–48.

*Primary Examiner*—Samuel A. Acquah
(74) *Attorney, Agent, or Firm*—Marshall & Melhorn, LLC

(57) ABSTRACT

The invention relates to a method for producing polyesters with a reduced content of free acetaldehyde from terephthalic acid and ethylene glycol via a catalyzed polycondensation in the melt and also the use of this method. The method is based thereby on the usage of highly active polycondensation catalysts, on the deactivation of these catalysts by the addition of phosphorous-containing inhibitors and the addition of acetaldehyde-bonding substances. The entire polycondensation is thereby implemented at temperatures beneath 280° C.

34 Claims, 1 Drawing Sheet

METHOD FOR PRODUCING POLYESTERS WITH A REDUCED CONTENT OF FREE ACETALDEHYDE

The invention relates to a method for producing polyesters with a reduced content of free acetaldehyde from terephthalic acid and ethylene glycol via a catalysed polycondensation in the melt and the use of this method.

Polyesters made of dicarboxylic acids and diole, in particular those of the type of polyethylene terephthalate and the copolyesters thereof with other dicarboxylic acids and alkylene glycols and also higher valent polycarboxylic acids and polyols, are used to a significant extent for producing containers and bottles for food and beverages.

For this reason, plant capacities for producing such polyester granulate grades have increased enormously, In the case of large plants, polyester can be produced more economically than previously. The competition of the producers put pressure on the prices. On the other hand, this in turn stimulates the development of new application possibilities and supersedes other materials such as PVC. Packaging polyester has thus become a bulk product, in the production and sale of which only small margins can be realised. In these circumstances, any improvement or simplification in the production process which increases the margins is of interest to the producers of packing polyesters.

Such a simplification in the production process resides in the fact that polyester with an average molar mass required for packaging purposes, measured via the intrinsic solution viscosity (IV), is produced by polycondensation in the melt. The intrinsic viscosity is measured thereby at 25° C. in phenol/dichlorobenzene (1:1) (see A. Horbach, R. Binsack, H. Müller, Angew. Makromol. Chem. 98 (1981) 35–48). As a consequence, the step of solid-state postpolycondensation is omitted, which is nowadays necessary without exception. This step is associated with significant expense in apparatus and energy; first of all the polyester melt is converted into an amorphous granulate. This granulate must be heated again and be treated by crystallisation in at least two steps, which are controlled precisely according to temperature and dwell time, for the subsequent solid-state post-polycondensation (SSP). Without this complex preparation, the result is baking or agglomeration of the granulate in the SSP, which implies production interruption, repair operations and product loss. The actual SSP requires dwell times of between approximately 6 and 15 hours and sweeping with inert gas which, for economic reasons, must be treated after use and returned into the process. This results in large reactor dimensions and a large number of auxiliary equipment and units for the gas cleaning and gas treatment with a corresponding energy requirement.

The spatial requirement and the building height should be emphasised in particular. In addition there is the additional cost of the supply, metering and removal of the solid material for the reason that the SSP and the gas treatment have to be executed at a high temperature and in the exclusion of atmospheric oxygen.

This large outlay on equipment and energy is unnecessary if the polycondensation is implemented in the melt up to the required molar mass. The mentioned molar masses concern number averages $M_n$ which was determined from the IV according to Horbach et al. (literature cited above). According to the state of the art to date it is possible to have a molar mass increase in the final stage of polycondensation in the melt, starting from approximately 6,000 g/mol to approximately 20,000 g/mol. An extension to higher molecular masses of 25,000 g/mol to 35,000 g/mol, maximum 40,000 g/mol has to date not been considered for two reasons;

1. No finishing reactors were available, with which higher molecular masses of 25,000 g/mol to 35,000 g/mol, maximum 40,000 g/mol could be achieved and which were able thereby to deliver an acceptable product quality with respect to colour, free acetaldehyde and content of vinyl ester end groups, (a measure of the thermal damage and of the potential for re-formation of acetaldehyde in further processing for example so as to form bottles).
2. Only SSP was able to produce a polyester granulate which had the low concentration of free acetaldehyde (AA) necessary for processing into beverage bottles and a low AA re-formation during processing of the granulate into bottles (injection moulding, stretch blow moulding).

In the meantime the development of the "DISCAGE" end reactors of the Inventa-Fischer company has progressed so far that the first reason no longer plays a decisive role. Reference is made hereby to EP 0 719 582 and the reactor type described there with all of the embodiment variants is included in this application.

It is hence possible to maintain colour, AA and the concentration of vinyl ester end groups at a level which makes application of AA-bonding additives useful. In addition it has become possible to achieve the required molar mass increase with a single end reactor. By using two end reactors which are connected in series, the molar mass increase could indeed be achieved more easily but it would be necessary to accept the disadvantages of a longer dwell time in the melt (and hence increased formation of colour, AA and vinyl ester groups) and the greater expense of equipment.

Polyesters are produced according to the state of the art by melt polycondensation from low molecular esters of dicarboxylic acids with alkylene diols at increased temperatures by separating water and alkane diols. The separation of the volatile products of the polycondensation is effected by the application of vacuum and an intensive mixing of the melt. By adding special catalysts, in particular metal compounds such as antimony trioxide, the polycondensation is accelerated and the attainment of high molecular masses is made possible, such as are required for production of these containers.

The high temperatures during production and processing of the melt are the cause of decomposition reactions of the polyesters which lead to the release of acetaldehyde via several steps, said acetaldehyde remaining in the melt and escaping gradually after processing into containers and bottles from there, diffusing into the enclosed food and beverages and affecting their smell and taste disadvantageously.

The thermal decomposition of the polyesters and hence the formation of acetaldehyde is however favoured by the known polycondensation catalysts. They all have a limited selectivity, i.e. they catalyse not only the mole mass structure (chain lengthening) but also the molar mass decomposition—in varying degrees—by thermal ester cleavage.

The manner used almost exclusively to date for production comprises the polycondensation of the raw materials terephthalic acid and ethylene glycol (with supplements of smaller quantities of comonomers such as isophthalic acid, diethylene glycole or cyclohexamethylene diole for improving the processing properties in the melt up to an average molar mass of approximately 20,000 g/mol (IV 0.63). In order to further increase the average molar mass to the values required for packaging purposes of between 25,000 and 30,000, max. 40,000 g/mol, there is used nowadays exclusively solid-state post polycondensation.

For this purpose, polyester melt is converted into a solid granulate after achieving an average molar mass of approximately 20,000 which is not yet sufficient for the production of bottles. Subsequently, this granulate is further condensed in a solid-state polycondensation at temperatures below the melting point until the required average molar mass is achieved.

The solid-state polycondensation offers the advantage that, at lower temperatures, the above-mentioned decomposition reactions do not occur or only to a greatly reduced extent and furthermore that already present acetaldehyde escapes from the granulate particles under the conditions of the solid-state polycondensation and is removed. In this way, a high molecular polyester granulate with an acetaldehyde content under 3 ppm and up to under 1 ppm is obtained, which is used for further processing into containers and bottles. Further processing of the high molecular polyester granulate which is extensively freed of acetaldehyde is effected according to the current state of the art in such a manner that the granulate, after drying to a residual moisture of less than 50 ppm, is melted and is formed into so-called preforms which are then blown in a further operation into bottles. During melting of the granulate and in the melt channels to the injection moulds, renewed thermal degradation of the material takes place however which leads to renewed release of acetaldehyde and causes the mentioned impairments of the products.

Furthermore, implementation of the solid-state polycondensation is technically complex and demands long dwell times in the reactors.

Direct production (i.e. without implementation of a solid-state polycondensation) of high molecular polyester granulates with a low content of acetaldehyde from the polyester melt is known from the U.S. Pat. No. 5,656,719 according to which the polyester melt is freed of acetaldehyde by introduction of an inert gas into the melt and subsequent degassing of acetaldehyde. The disadvantage resides in the fact that degassing of the polyester melt sets high requirements on the technical equipment and industrial-scale application of this method is not realisable.

U.S. Pat. No. 4,837,115 teaches another solution by the addition of a polyamide to the polyester. The addition of polyamides has however the disadvantage thereby that these are not miscible with the polyesters and lead to a dulling effect of the polyester, as a result of which the clarity and transparency of the processing product (for example bottle) is greatly impaired. At the same time, the thermal decomposition of the polyamides leads to significant discoloration in the matrix.

In U.S. Pat. Nos. 5,656,221 and 5,258,233, the combination of these two methods, the addition of polyamides and the degassing of the polyester melt is described. However, the already mentioned disadvantages also occur here to the same extent.

Against this background, it was the object of the invention to create a method for producing a high molecular polyester granulate for the production of containers for food and beverages with a low content of acetaldehyde in the final product without using solid-state post polycondensation (SSP) and also complex degassing apparatus.

The object is achieved by a method of this type with the features of patent claim 1. Sub-claims 2 to 29 indicate advantageous developments of the method.

The use of the method according to the invention is characterised by the features of the patent claims 30 to 32.

This object is achieved by a method in which the melt is polycondensed up to a molar mass which is adequate for production of containers. The polycondensation in the melt is executed thereby in conditions in which especially little acetaldehyde is produced. What is relevant for this purpose is the usage of highly active catalysts in low dosages and deactivation thereof with inhibitors, as soon as the required molar mass of the polyester which is determined by the intrinsic viscosity (IV) is achieved. In the case where the residual concentration of acetaldehyde, which is achievable by means of these measures, is still too high in the preform, substances are added to the melt after the required molar mass has been achieved, which substances effect a chemical or physical bond with the acetaldehyde which is present and that which is formed during processing, and thus prevent the disadvantageous effect on smell and taste. The polycondensation is maintained thereby at temperatures beneath 280° C.

The background to these measures is the following:

a) Use of a Highly Active Catalyst in a Low Concentration:

The polycondensation catalyst influences the temperature and the dwell time which is necessary to achieve a desired molar mass. On the other hand it also catalyses the thermal decomposition unavoidably in addition to the polycondensation. These correlations are generally used in the case of industrial polycondensation processes in order to produce thermally stable polyesters. Of particular importance here is the high activity of the catalyst at relatively low temperatures of the reacting melt. The antimony catalyst used exclusively to date in industrial scale production represents a compromise between reactivity and selectivity. Highly active catalysts such as compounds of titanium (IV) permit better compromises, by means of choosing low dosage and low reaction temperatures, with respect to the molar mass increase and to the thermal decomposition.

b) Inhibition of the Polycondensation Catalyst After the Desired Molar Mass has Been Achieved:

During polycondensation in the melt it is important that the catalyst is not inhibited by added stabilisers. However as soon as the desired molar mass is achieved its object is fulfilled and its further activity resides only in the catalysis of undesired reactions such as thermal ester cleavage and production of acetaldehyde and vinyl ester groups. A feature of the present invention resides in reducing further formation of thermal decomposition products by the catalyst and hence in producing a thermally more stable polyester, This occurs as a result of the fact that, after achieving the desired molar mass of the melt, a stabiliser is added against thermal decomposition besides the additive which bonds the acetaldehyde. For example by adding a phosphorous-containing stabiliser, titanium (IV) catalysts can be inhibited, There are suitable as stabilisers all of the phosphorous compounds as long as they are soluble in the polyester melt or effect a reaction with these even at high melt viscosity, which reaction leads to a homogenous phase.

By means of this later stabilisation, not only can the titanium catalyst be inactivated but also, by the addition of an excess, all heavy metal traces which proceed into the polyester with the raw material as an impurity or originate from abrasive or corrosive processes in the polycondensation plant. When dosing the added quantity of stabiliser, care no longer needs to be taken about the inhibiting effect thereof on the catalyst, as is the case when adding the stabilizer before or during the polycondensation.

c) Addition of a Substance Which Bonds the Acetaldehyde:

In order to set a particularly low concentration of acetaldehyde in the preform, as is demanded for example for production of mineral water bottles, the addition of acetaldehyde-bonding substances is provided.

The acetaldehyde-bonding additive is added in a concentration which bonds not only the free acetaldehyde which is already present in the polyester at the feeding point Rather, a specific excess is used in proportion to this free acetaldehyde concentration. This excess bonds the acetaldehyde which is still formed after the feed point in the melt up to granulation. In addition said excess must bond the acetaldehyde which is newly formed during remelting and injection moulding in order that there occurs in the preform less than 10 ppm, preferably less than 5 ppm.

It is clear from this illustration that the more of the acetaldehyde-bonding additive must be added, the greater is the content in the polyester melt of free acetaldehyde and vinyl ester end groups (the precursor, from which free acetaldehyde is formed again) at the feed point. The additives according to the invention, with respect to their mass, are fundamentally more expensive than the polyester with which they are mixed, In addition they also have disadvantageous effects on the polyester. In particular, this is the yellow colouring of the product which is weaker or stronger according to the type of compound. The invention therefore involves as little thermal damage to the polyester as possible during the polycondensation and up to granulation. In addition it is the subject of the invention that the feeding of the acetaldehyde-bonding additive is effected in the melt after the polycondensation. Directly after the polycondensation, the concentration of free acetaldehyde in the melt is between 1 and 10 ppm and hence very low because of the vacuum which is prevalent in the reactor. It has been established as not effective to feed the acetaldehyde-bonding additive to the melt before the finishing reactor. In this case, quantities thereof have to be added which are far above 1% and hence are neither economically acceptable nor acceptable from the standpoint of product quality.

Dulling in the end product can be prevented by choosing the acetaldehyde-bonding amide in its composition and molar mass such that the refractive index of the amide is equal to that of the polyester.

The source of the free and bonded acetaldehyde is the thermal decomposition of the polyester. This concerns chemically an ester cleavage which is assisted by high temperatures and long dwell times. It is known in the case of antimony-catalysed polyesters that the activation energy of the thermal decomposition with approximately 190 kJ/mol is substantially higher than that of the polycondensation (55 kJ/mol). Every degree of temperature reduction during the polycondensation will accordingly reduce the thermal decomposition substantially more than the polycondensation rate. However, there are limits to the temperature reduction because the viscosity of the melt increases with decreasing temperature. High viscosity effects a greater thermal decomposition in stagnating melt regions (inadequate mixing), in particular near solid walls. The superimposition of positive and negative influences leads to a temperature optimum which, in addition to the type of the catalyst, also still depends on the design of the polycondensation reactor. The finishing reactors of the "Discage" design have proved to be particularly suited, even at such low melt temperatures as 270° C., to still maintain an adequate polycondensation rate with a low thermal decomposition.

The mentioned measures for lowering the acetaldehyde content make it possible to limit the required quantity of these additives to a concentration below 1% by mass. This is necessary for economic reasons and because these substances also have disadvantageous side effects on the products (colour, loss in molar mass of the polyester).

Preferably the polycondensation is implemented at a temperature beneath 275° C.

The addition of the inhibitor is effected preferably when the intrinsic viscosity (IV) of the polyester melt is between 0.73 and 0.92.

There is added preferably to the terephthalic acid a further dicarboxylic acid, such as for example isophthalic acid or adipic acid in a concentration up to 10% by mole.

It is preferred, in addition to ethylene glycol, to use further alkane diols and/or polyols in a concentration up to 5% by mole.

A particularly low dosage of the titanium catalyst below 0.1 mmol/mol dicarboxylic acid has proved to be preferred for the production, hitherto unpractised, of polyesters in the melt which have molar masses up to 40,000 g/mol with a minimum of thermal decomposition (or a minimal concentration of acetaldehyde and vinyl ester end groups), as a result of which a thermally especially stable polyester can be produced. The additional use of cobalt, as is taught in EP 0 827 518 for the production of precursor polymers with an average molar mass up to approximately 20,000 g/mol for counterbalancing the inhibiting effect of the phosphorous-containing stabilisers, is not necessary here. It is extremely preferred to choose the concentration of the titanium-containing catalyst <0.05 mmol/mol dicarboxylic acid. In polycondensation tests at 270° C., it emerged surprisingly that 0.02 mmol/mol titanium/dicarboxylic acid still have the same catalytic effect as 0.3 mmol/mol antimony.

Titanium-containing catalysts, and here particularly organic titanium (IV) compounds, are preferred as catalysts.

It has proved to be advantageous to use a phosphorous compound as inhibitor and thereby in particular an organic phosphorous compound. Included herein are many esters of phosphoric acid and of phosphorous acid and of phosphonic acid and phosphonous acid. Phosphorous compounds are preferred which leave no unpleasant or even dangerous cleavage products in the polyester and the cleavage products of which escape easily from the granulate or from the melt during further processing. In addition they are intended to produce no chain decomposition during mixing in the melt and hence no loss in molar mass.

In this sense, triethyl- or trimethyl phosphate are particularly suitable.

Suitable supplement forms are as a liquid or as a powdered solid material in a pure form or mixed with the acetaldehyde-bonding additive.

Preferably, a concentration of the organic phosphorous compound of at least 1 mol/mol titanium compounds is chosen. Previously, mixing of such small quantities of phosphorous stabilisers was not viable for industrial polyester production due to the complex mixing and homogenising process in the highly viscous melt. In the method according to the invention, this mixing process can however be combined with the addition of the acetaldehyde-bonding additives so that this implies no additional cost.

It was found surprisingly that polyesters, which comprise terephthalic acid and ethylene glycol and contain up to 5% by mol of other dicarboxylic acids such as isophthatlic acid, adipic acid and/or alkane diols such as butylene glycol, hexane diol, and which have a content of free acetaldehyde up to 100 ppm have, after intensive mixing and reaction with a monomeric or low molecular compound comprising polycarboxylic acid and the diamine of an aliphatic or aromatic hydrocarbon, a content of free acetaldehyde of below 10 ppm, preferably below 5 ppm.

Amides of polycarboxylic acids with multivalent amines which contain at least two free amino groups have proved to be particularly useful for the addition of acetaldehyde-bonding substances. Amides are chosen thereby particularly preferably which comprise dicarboxylic acids and diamines of hydrocarbon and preferably have a molar mass below 2,000 g/mol. It was established that these amides, if they are added in small quantities up to approximately 1% by mass to a polyester melt, lead, in contrast to polyamides according to the state of the art, to better transparency and clarity of the products obtained with their help.

Suitable amides can be produced by condensation reaction from the dicarboxylic acids and diamines mentioned in Table 1.

A further suitable amide can be produced by mixing an organic diamine, for example 1,3-bis-(aminomethyl)-benzene with polyester melt at a temperature between 265 and 290° C. in a mass ratio 1:20 up to 1:200. The reaction product can be cooled and granulated and the granulate can be added, after drying, as an acetaldehyde-banding additive to a polyester melt with a molar mass between 20,000 and 40,000. The reaction product can however also be mixed directly in the molten phase with further polyester melt of the same or of another origin in order to produce therefrom products with reduced AA.

The acetaldehyde-bonding additives according to the invention cause a weaker or stronger yellowing of the polyester and of the bottles, containers or films produced therefrom. By means of preferred addition of blue and red colourants, which are soluble in the melt, in a very small concentration to the polyester melt, the final product can be given a neutral or faintly bluish tone. As a result, the yellow hue which is caused by the acetaldehyde-bonding additives according to the invention can be compensated for or a desired colour tone can be set.

There are suitable as colourants those from the group of anthraquinones, for example from the Polysynthren series, in particular the types Polysynthren Blue RBL and Polysynthren Red GFP. Concentrations under 5 ppm, preferably under 2 ppm, have proved to be adequate for setting a neutral or slightly bluish colour tone. These colourants can be added as a highly diluted suspension in ethylene glycol during the polycondensation process, preferably after completion of esterification or transesterification.

By means of the method according to the invention, the production of a granulate with significantly less crystallinity is made possible. While granulate which comes from solid-state post condensation has a crystallinity of 50–60%, measured via the granulate density, granulate according to the method according to the invention has a crystalline proportion of around only 40%. In order to achieve complete melting in the plasticising screw of an injection moulding machine, lower temperatures can be used than in the case of the granulate from the solid-state postpolycondensation. This has the effect of a reduced reformation of Acetaldehyde.

The method according to the invention opens up a way of leading polyester melts directly into an injection moulding machine—without intermediate granulation and crystallisation—and of processing them into preforms, as has been described for example in DE 195 05 680. The method according to the invention is avoiding the extruder used there. This implies a significant cost advantage as these extruders are cost intensive and can only be provided up to limited capacities.

Intensive mixing of the acetaldehyde blocker and of the catalyst inhibitor with the polyester melt has proved to be essential For this purpose a twin-screw extruder is suitable, to which the polyester melt is supplied and in the feed region of which the additive is metered in either in liquid form (molten) or in solid form (as a granulate or powder with an averager particle size of less than 0.1 mm) The twin-screw extruder has a degassing zone in which, by means of an applied vacuum, low molecular cleavage products of the chemical reaction between the additives and the polyester or the Acetaldehyde can be separated from the melt by evaporation. In the case of the acetaldehyde-reducing additive this concerns water and ethylene glycol which, without this separation possibility, would lead to a stronger hydrolytic or glycolytic decomposition of the polyester.

In the case of a large plant output, preferably a partial stream is diverted from the melt stream and guided through a twin-screw extruder. In this, the additives are metered in and mixed intensively into the partial stream. After degassing, the partial stream is again united with the main stream. The latter finally is mixed intensively and homogenised. This can take place in a static or dynamic mixer. This system has the advantage that, at large plant outputs, the expensive twin-screw extruder can be dimensioned not for the total melt stream but only for a partial stream which typically comprises approximately 10% of the total stream. The combination of an extruder with a static or dynamic mixer for mixing the partial and main stream which is then still necessary incurs fewer investment costs than a twin-screw extruder designed for the total stream.

Preferably the method is implemented by carrying out the final stage of the polycondensation in a reactor with a rotor which is configured as a hollow cylinder provided with openings and on which annular discs are mounted for forming a melt film and for promoting the polymer melt. This reactor type is described in more detail in EP 0 719 582.

The method is used for producing packaging of food and beverages. The production of beverage bottles and packaging ferns is thereby preferred The invention is described more fully subsequently with reference to FIG. 1 and the subsequent embodiments, given by way of examples.

Polyester is produced in a continuous process by means of esterification of terephthalic acid (TAP) with ethylene glycol (EG). From 98% by mol TAP and 2 % by mol isophthalic acid (IPA), a paste is mixed with ethylene glycol at the molar ratio of 1.15, relative to the sum of PTA and IPA. The paste is supplied to an esterification reactor in which, at a pressure of 2.2 bar (absolute) and a temperature of 265° C., an esterification degree of more than 90% is achieved within a dwell time of 90 minutes. The reactor is connected to a rectification column in which the vapours produced during the esterification reaction are separated into water and ethylene glycol, the EG returning into the reactor and the water leaving the process.

The product of the first esterification reactor proceeds into a second reactor where the esterification is progressed so far that the concentration of carboxyl end groups is less than 250 mmol/kg and the degree of polycondensation is more than 6. Tetrabutyl titanate in the form of a 1% solution in ethylene glycol is fed into this reactor as catalyst and mixed. The quantity of catalyst is 0.04 mmol/mol dicarboxylic acid. The pressure in this reactor is the ambient pressure, the temperature is 270° C., the dwell time is approximately 1 hour.

In addition a quantity of 1.2 ppm, relative to the mass of the polyester, of a blue anthraquinone colourant which is heat-resistant and soluble in polyester and which is suspended in EG is fed and mixed with the melt.

BRIEF DESCRIPTION OF THE DRAWING

The following precondensation takes place in a vacuum of 30 mbar at a temperature of 270° C. within a further hour.

The degree of polycondensation thereby increases to 30 and the carboxyl end groups go down to approximately 70 mmol/kg. The further process steps are illustrated in FIG. 1.

Figure 1:
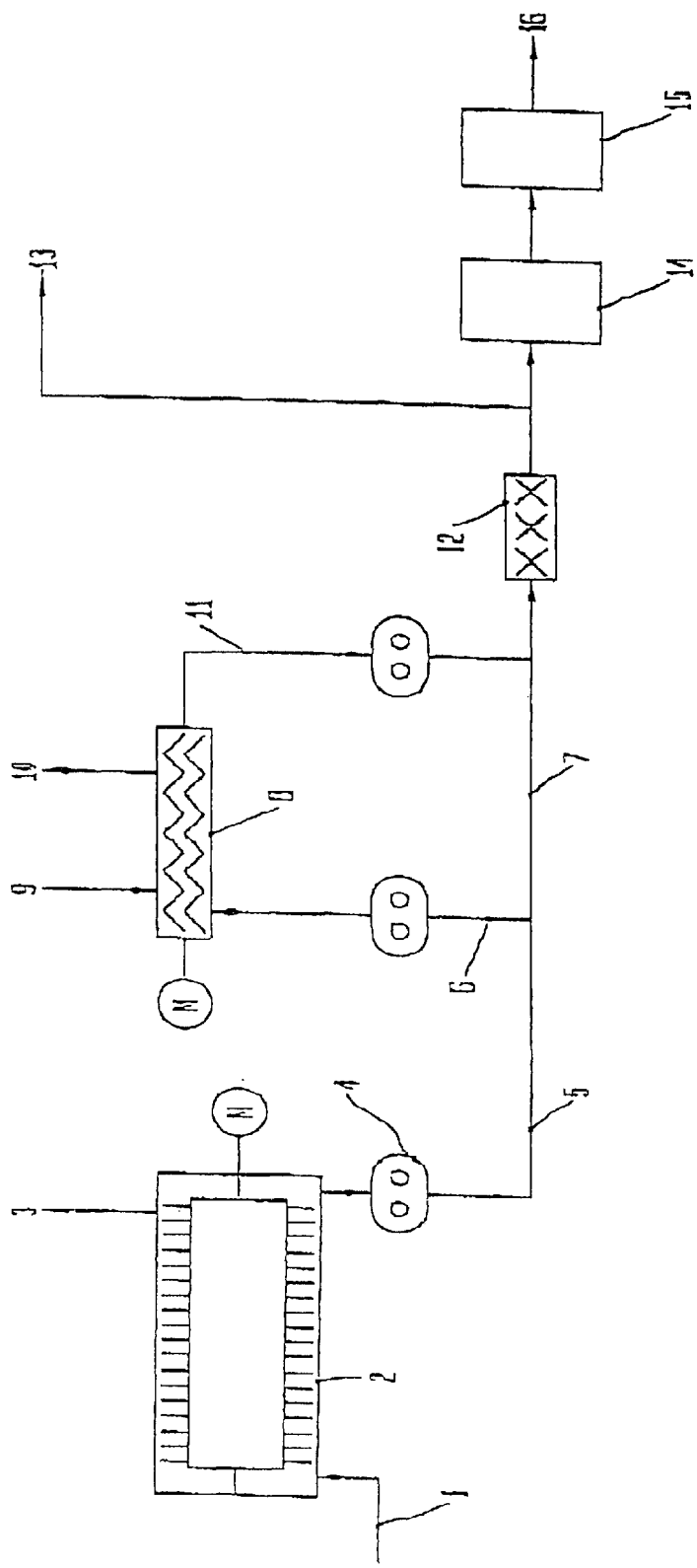

This precondensate (1) goes into the final stage of the polycondensation (2) which takes place in a reactor with a horizontal cage agitator of the "DISCAGE-C" design of the INVENTA-FISCHER company. In this reactor, the temperature of the melt rises from 270° C. at the inlet gradually up to 275° C. at the outlet. The dwell time is 120 minutes, the vacuum (3) is set at 0.7 mbar on average such that the melt viscosity measured on-line after the reactor with a capillary viscometer remains constant and that the intrinsic viscosity (IV) is 0.85.

The vapours from the precondensation- and polycondensation reactor are condensed in spray condensers of the INVENTA-FISCHER design with pre-cooled EG and the residual gases are sucked off by means of four-stage vapour jet vacuum pumps.

The melt stream is withdrawn from the end reactor by means of a gear pump (4) and, if necessary, is divided into two partial streams (6 and 7) after passing through a melt filter with a continuous screen changer. The division is effected in such a manner that 10% of the total stream (5) is moved through a twin-screw extruder (8). In the twin-screw extruder, 5% terephthalic acid-di(4-amino-methylbenzylamide) is added in a molten form into the polyester melt (9) and is mixed intensively. At the same time, however at another feed point, triethylphosphate (liquid) is supplied in a pure form to the melt in the twin-screw extruder, the quantity being 0.06 mmol/mol of dicarboxylic acid. Law molecular cleavage products, which are produced by chemical reaction of the added substances with the polyester melt, are removed from the melt by means of a vacuum through a degassing pipe connection (10). After leaving the extruder, this melt stream (11) is united with the main stream (7). The united stream is homogenised in a static mixer of the Kenics (12) type and supplied to a granulation device (14). The dwell time of the melt between the discharge pump of the finisher and the granulation device is limited by appropriate dimensioning of the pipes to less than 20 minutes. The granulate has a content of free acetaldehyde of 3 ppm, measured by headspace gas chromatography.

The amorphous granulate goes into an continuous crystalliser (15), described for example in EP 0 5 975 155, with an average dwell time of 20 minutes, where it is heated to 170° C. during intensive movement and is converted into the semicrystalline state. After cooling to below 60° C., the granulate (16) is ready for packaging, storing or transportations.

The melt occurring after the static mixer can also be fed directly (13) via a melt distribution system into parallel operated injection moulding machines and be processed into bottle preforms.

In order to produce preforms for beverage bottles, the granulate is supplied to a continuous polyester drier, design of for example INVENTA-FISCHER. In a moving bed which is subjected to a counter current flow of dried air of 160° C. and a dew-point of −30° C. in counterflow, the granulate is heated to this temperature and, within a residence time of 5 hours, is dried to less than 50 ppm residual moisture. The dry granulate flows to the plasticising screw of an injection moulding machine where it is processed to a melt of 275° C. The melt is pressed by the machine in small doses via a channel system into a cooled mould with 96 cavities. After brief cooling the mould is opened and the finished preforms are ejected. The cycle time of the process is 15 seconds. The acetaldehyde content in the wall of the preform is on average 5 ppm, measured by headspace gas chromatography on the ground and homogenised preform.

EXAMPLE 1

990 g polyethylene terephthalate granulate, comprising 99% by mol terephthalic acid, 1% by mol isophthalic acid and ethylene glycol, with an intrinsic viscosity (IV)=0.8 and which has a content of 40 ppm free acetaldehyde, are dry mixed with 10 g terephthalic acid-di(4-amino-methylbenzylamide) and melted in a twin-screw extruder at a temperature of 270–280° C., mixed in the melt, extruded into a strand and regranulated. The granulate contains 0.5 ppm free acetaldehyde.

EXAMPLE 2

900 g polyethylene terephthalate as in example 1 are mixed in an extruder with 100 g terephthalic acid-di(4-amino-methylbenzylamide) and extruded into a strand and granulated.

EXAMPLE 3

900 g PET as in example 1 are dry mixed with 100 g PET granulate, produced according to example 2, and melted in an extruder, mixed, extruded and regranulated. The granulate contains 1.0 ppm free acetaldehyde.

EXAMPLE 4

990 g PET granulate as in example 1 are dry mixed with 10 g adipic acid-di(4-amino-methylbenzylamide) and melted in an extruder as in example 1, mixed, extruded and regranulated. The granulate contains 0.6 ppm free acetaldehyde.

EXAMPLE 5

In a continuous plant for producing polyethylene terephthalate, a melt stream is obtained from the finisher in which the PET has an average molecular mass of 30,000 g/mol and a content of free acetaldehyde of 45 ppm. The melt stream is divided in such a manner that 1/10 of the total stream is diverted and directed through a twin-screw extruder. In the extruder, the PET melt is mixed with 10% terephthalic acid-di(4-amino-methylbenzylamide). Next the melt streams 1 and 2 are united again, mixed in a static mixer and supplied to a granulation facility. The granulate has a content or free acetaldehyde of 1.5 ppm.

The granulate is dried to 50 ppm residual moisture and melted in an injection moulding machine and formed into preforms. The acetaldehyde content in the wall of the preform is on average 4 ppm.

TABLE 1

| Dicarboxylic acid component | Diamine component |
| --- | --- |
| Terephthalic acid | 1.3-bis-(amino-methyl)-benzene |
| Terephthalic acid and adipic acid | Hexamethylene diamine |
| Terephthalic acid and adipic acid | Hexamethylene diamine and 1.3-bis-(aminoethyl)-benzene |

What is claimed is:

1. Method for producing polyesters with a reduced content of free acetaldehyde from terephthalic acid and ethylene glycol via a catalysed polycondensation in the melt in which
   a) the catalyst is added before the polycondensation,
   b) after reaching an intrinsic viscosity (IV) of the melt between 0.63 and 1.00, which is achieved without solid-state postcondensation, an inhibitor is added for deactivation of the catalyst and
   c) next an excess of a substance which bonds the free acetaldehyde is added so that even subsequently released acetaldehyde is bonded,
a temperature beneath 280° C. being maintained during the entire course of the polycondensation.

2. Method according to claim 1, characterised in that the polycondensation is executed at a temperature beneath 275° C.

3. Method according to claim 1, wherein the inhibitor is added in step b) at an intrinsic viscosity (IV) between 0.73 and 0.92.

4. Method according to claim 1, wherein a further dicarboxylic acid in addition to terephthalic acid is added in a concentration up to 10% by mole.

5. Method according to claim 1, wherein further alkane diols and/or polyols in addition to ethylene glycol are added in a concentration up to 5% by mole.

6. Method according to claim 1, wherein in step a) the concentration of a catalyst is less than 0.1 mmol/mol dicarboxylic acid.

7. Method according to claim 1, wherein in step a) the concentration of the catalyst is less than 0.05 mmol/mol dicarboxylic acid.

8. Method according to claim 1, wherein in step a) a titanium-containing catalyst is used.

9. Method according to claim 1, wherein in step a) an organic Ti (IV) compound is used.

10. Method according to claim 1, wherein in step b) a phosphorous-containing inhibitor is used.

11. Method according to claim 1, wherein in step b) an organic phosphorous compound is used.

12. Method according to claim 1, wherein in step b) trimethyl- or triethyl phosphate is used.

13. Method according to claim 1, wherein in step b) the concentration of the organic phosphorous compound is at least 1 mol/mol titanium.

14. Method according to claim 1, wherein the organic phosphorous compound is added to the melt together with the acetaldehyde-bonding additive.

15. Method according to claim 1, wherein in step c) the amide of a polycarboxylic acid and a multivalent amine, containing at least two free amine functions, is used.

16. Method according to claim 1, wherein in step c) the amide of a dicarboxylic acid and of a diamine is used.

17. Method according to claim 1, wherein in step c) the amide has an average molecular mass below 2000.

18. Method according to claim 1, wherein in step c) the amide is used in a concentration of less than 1% by mass.

19. Method according to claim 1, wherein in step c) terephthalic acid and/or adipic acid is used as dicarboxylic acid and hexamethylene diamine and/or 1,3-bis-(aminomethyl)-benzene is used as the diamine.

20. Method according to claim 1, wherein in step c) terephthalic acid is used as dicarboxylic acid and 1,3-bis-(aminomethyl)-benzene is used as diamine.

21. Method according to claim 1, wherein in step c) only one diamine is added which forms amides with the dicarboxylic acids present in the polyester melt.

22. Method according to claim 1, wherein, during or after the polycondensation, a colorant which is soluble in the polyester and which is stable and non-reactive in the polyester melt at up to 280° C. is added for correcting the color of the final product.

23. Method according to claim 1, wherein, during or after the polycondensation, colorant from the group of anthraquinones are added.

24. Method according to claim 1, wherein the colorant is added in a concentration below 5 ppm.

25. Method according to claim 1, wherein the polyester melt after the polycondensation and after mixing of all the additives is granulate and the amorphous granulate is crystallized.

26. Method according to claim 25, wherein the crystalline proportion of the granulate is less than 40% measured over the density.

27. Method according to claim 1, wherein the polyester melt is supplied after polycondensation and after mixing of the additives directly to injection molding machines for producing preform.

28. Method according to claim 1, wherein in the steps b) and c) a partial stream of melt is diverted from one melt stream which originates from a continuous polycondensation, and into which partial stream the additives are metered and mixed in an extruder with a degassing possibility, the low molecular cleavage products being removed from the melt by a vacuum, and the partial stream then being united again with the main stream of the melt and mixed intensively.

29. Method according to claim 1, wherein the final stage of the polycondensation is executed in a reactor with a rotor which is configured as a hollow cylinder provided with openings and on which annular discs are mounted in order to form a melt film and to transport the polymer melt.

30. A method of producing packaging for food and beverages including the steps of:
   a) producing polyesters with a reduced content of free acetaldehyde from terephthalic acid and ethylene glycol via a catalyzed polycondensation in the melt in which;
      i) the catalyst is added before the polycondensation,
      ii) after reaching an intrinsic viscosity (IV) of the melt between 0.63 and 1.00, which is achieved without solid-state postcondensation, and inhibitor is added for deactivation of the catalyst, and
      iii) an excess of a substance which bonds the free acetaldehyde is added so that even subsequently released acetaldehyde is bonded, a temperature lower than 280° C. being maintained during the entire course of the polycondensation.

31. A method of producing beverage bottles including the steps of:
   a) producing polyesters with a reduced content of free acetaldehyde from terephthalic acid and ethylene glycol via a catalyzed polycondensation in the melt in which;
      i) the catalyst is added before the polycondensation,
      ii) after reaching an intrinsic viscosity (IV) of the melt between 0.63 and 1.00, which is achieved without solid-state postcondensation, an inhibitor is added for deactivation of the catalyst, and
      iii) an excess of a substance which bonds the free acetaldehyde is added so that even subsequently released acetaldehyde is bonded, a temperature lower than 280° C. being maintained during the entire course of the polycondensation.

32. A method of producing packaging films including the steps of:
   a) producing polyesters with a reduced content of free acetaldehyde from terephthalic acid and ethylene glycol via a catalyzed polycondensation in the melt in which;
      i) the catalyst is added before the polycondensation,
      ii) after reaching an intrinsic viscosity (IV) of the melt between 0.63 and 1.00, which is achieved without solid-state postcondensation, an inhibitor is added for deactivation of the catalyst, and
      iii) an excess of a substance which bonds the free acetaldehyde is added so that even subsequently released acetaldehyde is bonded, a temperature lower than 280° C. being maintained during the entire course of the polycondensation.

33. Method according to claim 4, wherein the further dicarboxylic acid in addition to terephthalic is isophthalic acid or adipic acid.

34. Method according to claim 21, wherein the diamine added in step c) is hexamethylene diamine or 1,3-bis-(aminomethyl)-benzene.

* * * * *